US012766840B2

(12) United States Patent
Sugiura et al.

(10) Patent No.: US 12,766,840 B2
(45) Date of Patent: Oct. 20, 2026

(54) LIQUID EJECTING HEAD

(71) Applicant: BROTHER KOGYO KABUSHIKI KAISHA, Nagoya (JP)

(72) Inventors: Keita Sugiura, Toyokawa (JP); Hiroshi Katayama, Anjo (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 196 days.

(21) Appl. No.: 18/589,517

(22) Filed: Feb. 28, 2024

(65) Prior Publication Data

US 2024/0326435 A1 Oct. 3, 2024

(30) Foreign Application Priority Data

Apr. 3, 2023 (JP) ................................ 2023-059733

(51) Int. Cl.

*B41J 2/155* (2006.01)
*B41J 2/14* (2006.01)
*B41J 2/175* (2006.01)
*B41J 29/02* (2006.01)

(52) U.S. Cl.

CPC ........... *B41J 2/155* (2013.01); *B41J 2/14201* (2013.01); *B41J 2/175* (2013.01); *B41J 29/02* (2013.01); *B41J 2002/14491* (2013.01)

(58) Field of Classification Search

CPC ................ B41J 2202/12; B41J 2/14233; B41J 2002/14419; B41J 2/175; B41J 2/18; B41J 2202/20; B41J 2202/21; B41J 2/1433; B41J 2/14201; B41J 2002/14459; B41J 2/145; B41J 2002/14362; B41J 2002/14491; B41J 2002/14306; B41J 2/155; B41J 29/02

See application file for complete search history.

(56) References Cited

U.S. PATENT DOCUMENTS

| | | | | |
|---|---|---|---|---|
| 2010/0128089 | A1 | 5/2010 | Sugahara | |
| 2016/0288499 | A1 | 10/2016 | Sugahara et al. | |
| 2019/0299620 | A1 * | 10/2019 | Koide ...................... | B41J 2/145 |
| 2020/0101733 | A1 | 4/2020 | Hagiwara et al. | |

FOREIGN PATENT DOCUMENTS

| | | | |
|---|---|---|---|
| JP | 2010125597 | A | 6/2010 |
| JP | 2016190431 | A | 11/2016 |
| JP | 2020049874 | A | 4/2020 |

* cited by examiner

*Primary Examiner* — Jannelle M Lebron
(74) *Attorney, Agent, or Firm* — Element IP, PLC

(57) ABSTRACT

A liquid ejecting head has two unit heads. Each of the two unit heads includes a channel structure and actuators. The channel structure has nozzles, a supply channel, a return channel, a connecting channel connecting the supply channel and the return channel, a supply port, and a discharge port. The two unit heads are arranged to be shifted from each other in the first direction, and are adjacent along a third direction orthogonal to the first direction. The two unit heads have a same spacing distance in the first direction between the nozzles, and a set of the supply port and the discharge port of one unit head and a set of the supply port and the discharge port of the other unit head are arranged to be opposite to each other in the first direction.

10 Claims, 8 Drawing Sheets

LIQUID EJECTING HEAD

REFERENCE TO RELATED APPLICATIONS

This application claims priority from Japanese Patent Application No. 2023-059733 filed on Apr. 3, 2023. The entire content of the priority application is incorporated herein by reference.

BACKGROUND ART

There is a conventionally known ink-jet head (unit head) provided with a channel structure and a piezoelectric actuator arranged on the channel structure. The channel structure has a plurality of nozzles aligned along a first direction, a first manifold (supply channel) extending in the first direction and communicating with the nozzles, a second manifold (return channel) extending in the first direction, communicating with the nozzles and arranged side by side with the first manifold in a second direction orthogonal to the first direction, a connecting channel connecting one end part in the first direction of the first manifold and one end part in the first direction of the second manifold, an ink supply port communicating with the other end part in the first direction of the first manifold, and an ink discharge port communicating with the other end part in the first direction of the second manifold. The piezoelectric actuator has a plurality of active parts (actuators). Each of the active parts applies energy to ink in the channel structure so as to eject the ink from one of the nozzles. The ink supply port and the ink discharge port are arranged at the other end part in the first direction of the channel structure.

SUMMARY

In the field of the ink-jet head, in order to improve the yield, it is conceivable, for example, to combine a plurality of unit heads, each of which is the above-described ink-jet head, in a staggered manner along the first direction. In this case, it is possible to construct a head having a nozzle row, in which spacing distances of the nozzles are same in the first direction and which is longer than a nozzle row formed in one unit head.

In the above-described unit head, temperature of the ink supplied from the ink supply port to the first manifold during printing is increased due to heat transmitted from each of the actuators until the ink reaches the connecting channel. Further, during the printing, flow amount of the ink in the first manifold is greater at a location closer to the ink supply port, whereas the flow amount of the ink in the first manifold is smaller at a location closer to the connecting channel. As the flow amount of the ink is smaller, a cooling effect of cooling the channel structure and/or the actuators becomes smaller. Due to the increase in the temperature by the heat transferred from the actuators and the difficulty in obtaining the cooling effect due to the small flow amount, the temperature at the other end part in the first direction of the channel structure (an end part on the side of the ink supply port) is lower than the temperature at the one end part (an end part on the side of the connecting channel). Due to this, temperature of the ink in the first manifold is high at the one end part in the first direction of the first manifold, as compared with the other end part in the first direction of the first manifold, and viscosity of the ink in the first manifold is low at the one end part in the first direction of the first manifold, as compared with the other end part in the first direction of the first manifold. This causes any variation in ink ejecting property among the nozzles communicating with the first manifold.

Note that temperature of the ink flowing in the second manifold from the connecting channel toward the ink discharge port is also increased by the heat transferred from the actuators. During the printing, however, the amount of the ink flowing in the second manifold is smaller than the amount of the ink flowing in the first manifold, due to the above-described difference between the flow amounts. The temperature of the ink flowing in the second manifold toward the ink discharge port has been increased to some extent when the ink has passed through the first manifold. Due to this, the increase in the temperature in the ink flowing in the second manifold toward the ink discharge port is small, as compared with the increase in the temperature in the ink flowing in the first manifold from the supply port toward the connecting channel, and thus has little cooling effect. Accordingly, in the entirety of the channel structure, the temperature in the other end part in the first direction thereof is lower than the temperature in the one end part in the first direction thereof. In such a manner, in the channel structure of each of the unit heads, the temperature in the other end part in the first direction is lower than the temperature in the one end part in the first direction, which in turn causes the variation in the ink ejecting property due to the difference in the temperature of the ink in the first direction.

In a case that the head is constructed so that the ink supply ports each belonging to one of the unit heads are arranged on a same side in the first direction, there arises a large difference in the temperature in two unit heads which are adjacent in a direction orthogonal to the first direction, between an end part, of one unit head, on a side of the other unit head (an end part, of the channel structure, on a side opposite to the ink supply port, or an end part, of the channel structure, on a side of the ink supply port) and an end part, of the other unit head, on a side of the one unit head (an end part, of the channel structure, on the side of the ink supply port, or an end part, of the channel structure, on the side opposite to the ink supply port). This causes any unevenness in density, in an image formed by the ink ejected respectively from the nozzles arranged at the end parts in the above-described two unit heads, due to a difference in the ink amount caused by the difference in the temperature in the end parts.

In view of the above-described situations, an object of the present disclosure is to provide a liquid ejecting head capable of suppressing the unevenness in the density in a configuration wherein a plurality of unit heads is arranged.

According to an aspect of the present disclosure, there is provided a liquid ejecting head including a plurality of unit heads. Each of the unit heads includes a channel structure and a plurality of actuators arranged on the channel structure. The channel structure has: a plurality of nozzles aligned along a first direction; a supply channel extending in the first direction and communicating with the nozzles; a return channel extending in the first direction, communicating with the nozzles, and arranged side by side with the supply channel in a second direction crossing the first direction; a connecting channel connecting one end in the first direction of the supply channel and one end in the first direction of the return channel; a supply port communicating with the other end in the first direction of the supply channel; and a discharge port communicating with the other end in the first direction of the return channel. Each of the actuators is configured to apply energy to liquid in the channel structure to cause the liquid to be ejected from one of the nozzles, the actuators being arranged along the first direction to correspond to the nozzles, respectively. The unit heads are arranged to be shifted from each other in the first direction. The unit heads include two unit heads which are adjacent to each other in a third direction orthogonal to the first direction. The two unit heads have a same spacing distance in the first direction between the nozzles. In the two unit heads, a set of the supply port and the discharge port of one unit head and a set of the supply port and the discharge port of the other unit head are arranged to be opposite to each other in the first direction.

According to the liquid ejecting head of the present disclosure, the set of the supply port and the discharge port of the one unit head, of the two unit heads which are adjacent (two adjacent unit heads), is arranged on the side of the one end part in the first direction of the channel structure, and the set of the supply port and the discharge port of the other unit head, of the two adjacent unit heads, is arranged on the side of the other end part in the first direction of the channel structure. Owing to this, it is possible to make the difference in the temperature between the end part, of the one head unit, on the side of the other unit head and the end part, of the other head unit, on the side of the one head unit small. As a result, it is possible to make the difference in the liquid ejection amount, due to the difference in the temperature, between the two adjacent unit heads small. Thus, it is possible to suppress the unevenness in the density due to the difference in the liquid ejection amount.

DESCRIPTION

First Embodiment

Figure 1:
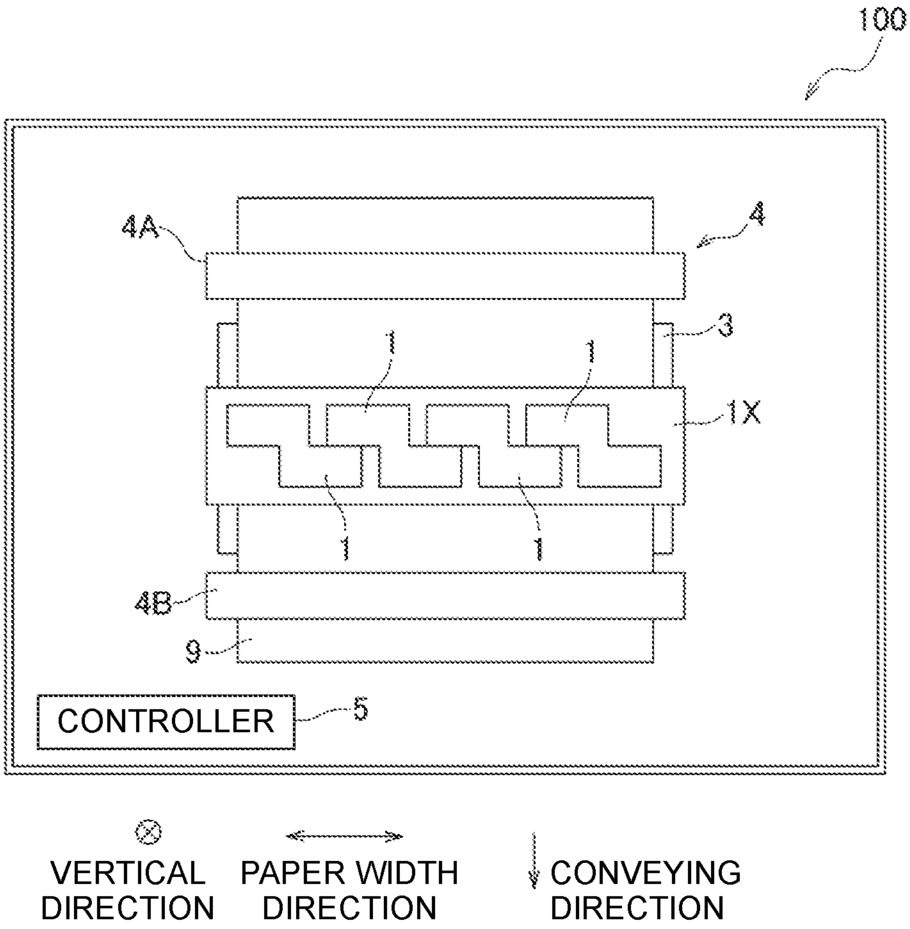
FIG. 1 is a plan view depicting a printer provided with a head according to an embodiment of the present disclosure.

First, an explanation will be given about the entire configuration of a printer 100 provided with a head 1 according to a first embodiment of the present disclosure, with reference to FIG. 1.

The printer 100 is provided with: a head unit 1X including four heads 1; a platen 3; a conveying mechanism 4; and a controller 5. A paper sheet 9 is placed on the upper surface of the platen 3.

The conveying mechanism 4 has two roller pairs 4A and 4B which are arranged while sandwiching the platen 3 therebetween in a conveying direction. In a case that a conveying motor (not depicted in the drawings) is driven by a control of the controller 5, the two roller pairs 4A and 4B rotate in a state that the two roller pairs 4A and 4B nip (pinch) the paper sheet 9 therebetween. With this, the paper sheet 9 is conveyed in the conveying direction.

The head unit 1X is long in a paper width direction (a "first direction" of the present disclosure: a direction orthogonal to both of the conveying direction and a vertical direction) and is of a line system in which an ink is ejected from each of nozzles 21 (see FIGS. 5 and 6) with respect to the paper sheet 9 in a state that a position of the head unit 1X is fixed. The four heads 1 (each of which corresponds to a "liquid ejecting head" of the present disclosure) are arranged in the paper width direction. Further, in two heads 1 which are adjacent to each other in the paper width direction, a spacing distance between a nozzle 21, of one head 1, which is closest to the other head 1 and a nozzle 21, of the other head 1, which is the closest to the one head 1 is same as a spacing distance T (see FIG. 5) of the nozzles 21 in each of the four heads 1.

The controller 5 includes a ROM, a RAM and an ASIC. The ASIC executes a recording processing, etc., based on a program stored in the ROM. In the recording processing, the controller 5 controls driver ICs 1M3 and 1N3 (see FIG. 3) of each of the heads 1 and a conveying motor (which is not depicted in the drawings) based on a recording instruction (including image data) inputted from an external apparatus such as a personal computer, etc., thereby recording an image on the paper sheet 9.

Figure 2:
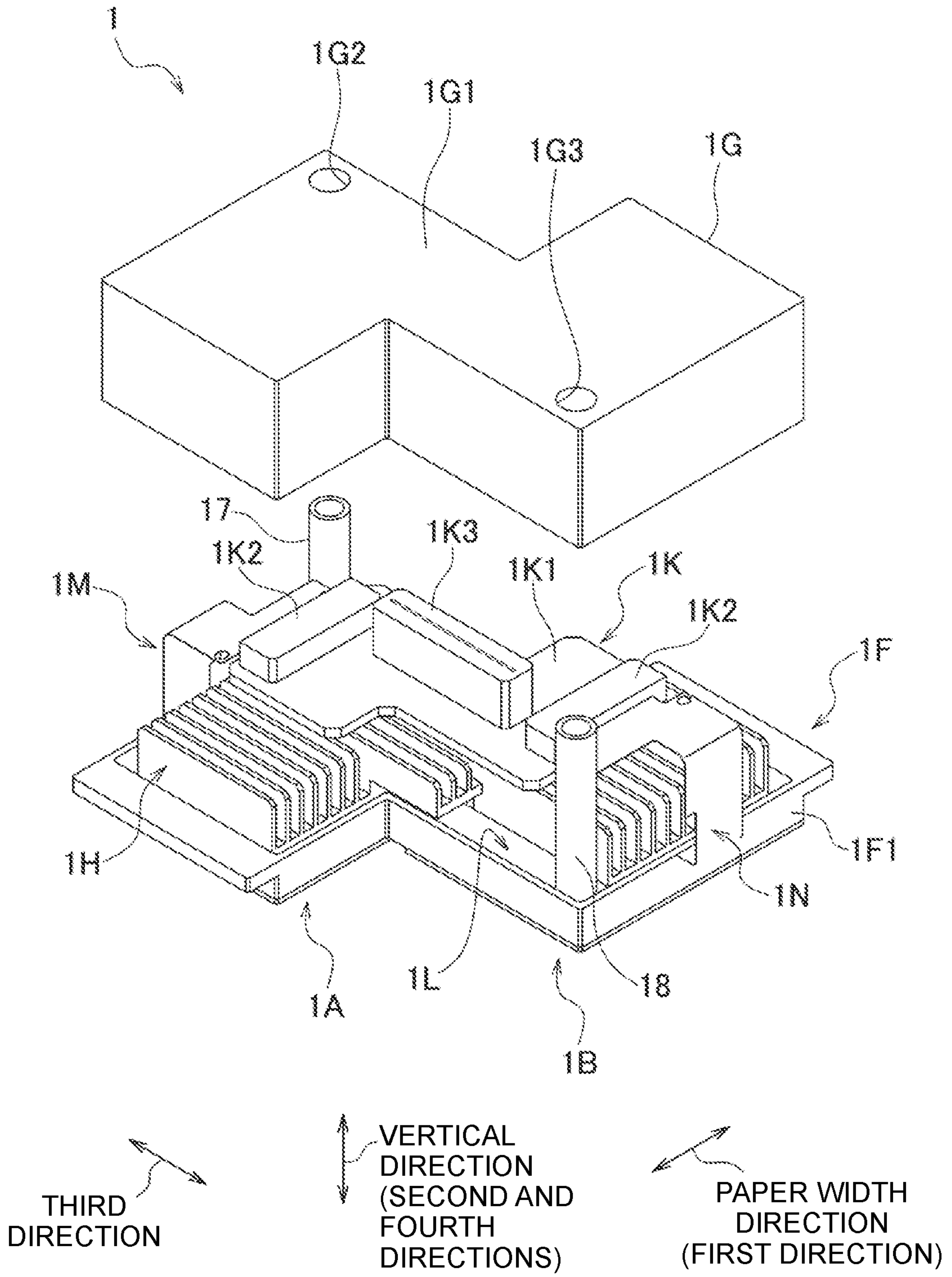
FIG. 2 is an exploded perspective view in which a cover of the head depicted in FIG. 1 is detached upward.
Figure 3:
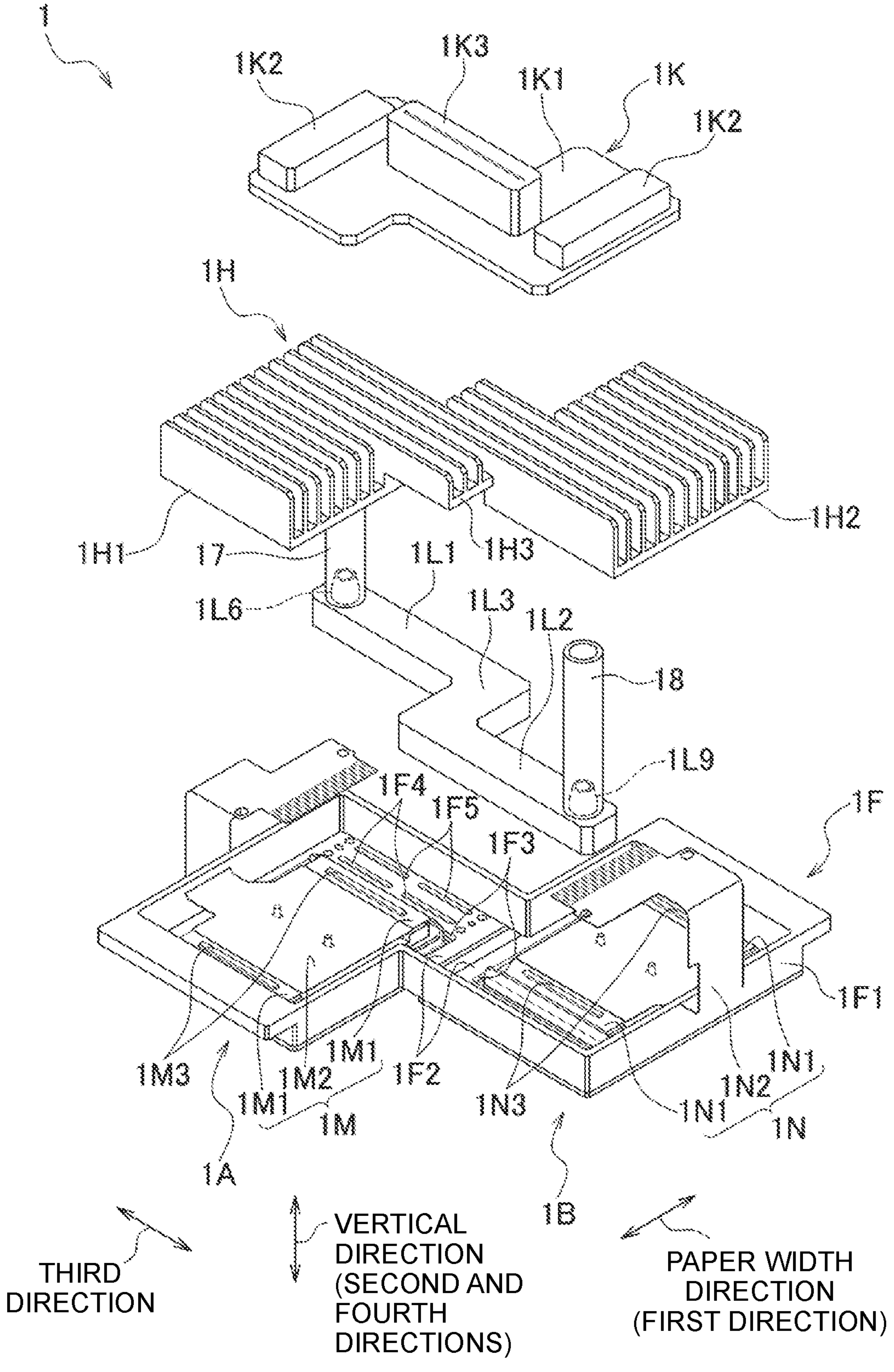
FIG. 3 is an exploded perspective view of a part of the head depicted in FIG. 2, except for the cover.

Next, an explanation will be given about the configuration of each of the heads 1, with reference to FIGS. 2 to 7. As depicted in FIGS. 2 and 3, each of the heads 1 includes the two unit heads 1A and 1B, a supporting frame 1F, a cover 1G, a heat sink 1H, a wiring substrate 1K and a channel member 1L.

Figure 5:
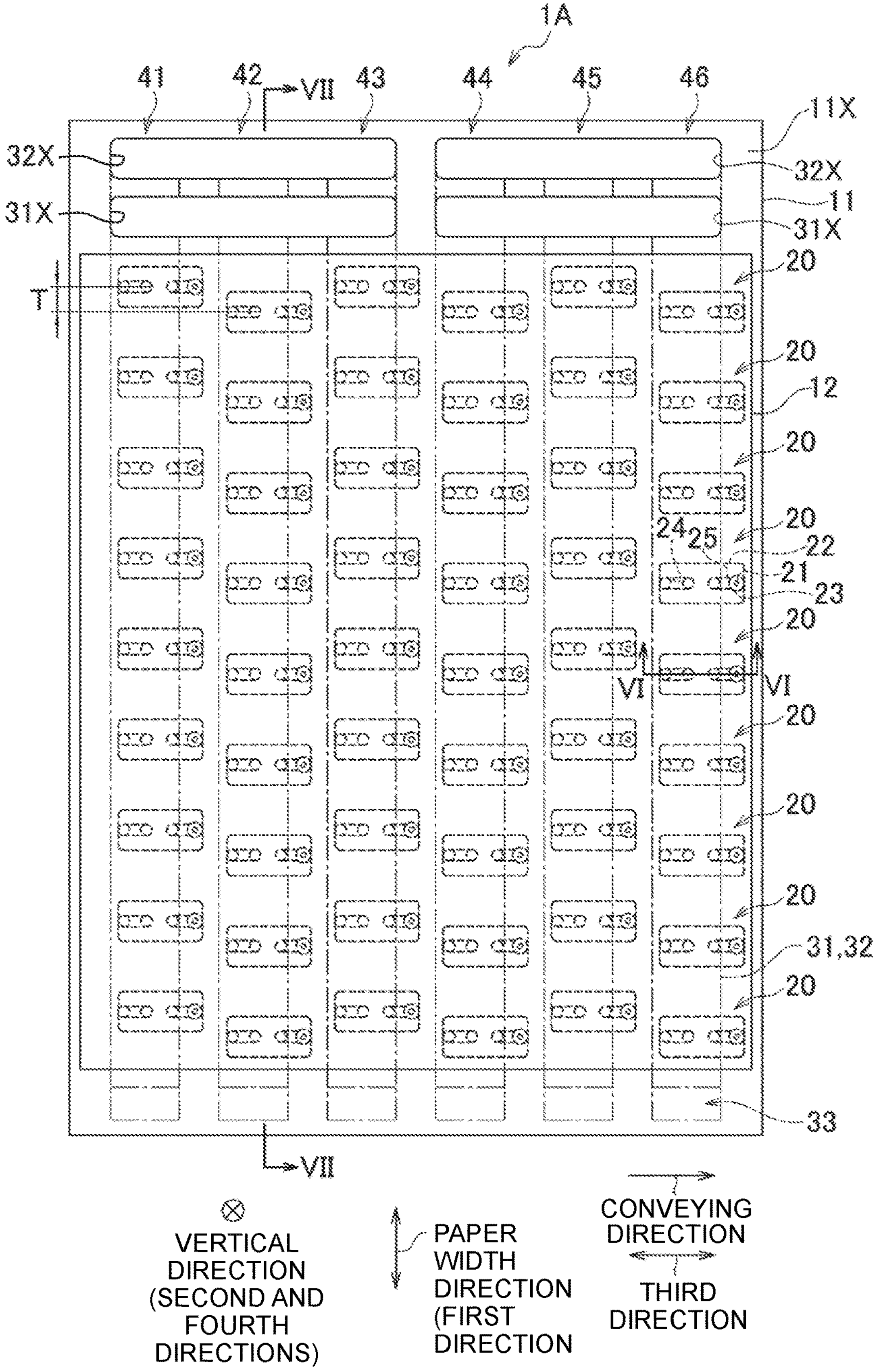
FIG. 5 is a plan view of a unit head depicted in FIG. 4.
Figure 7:
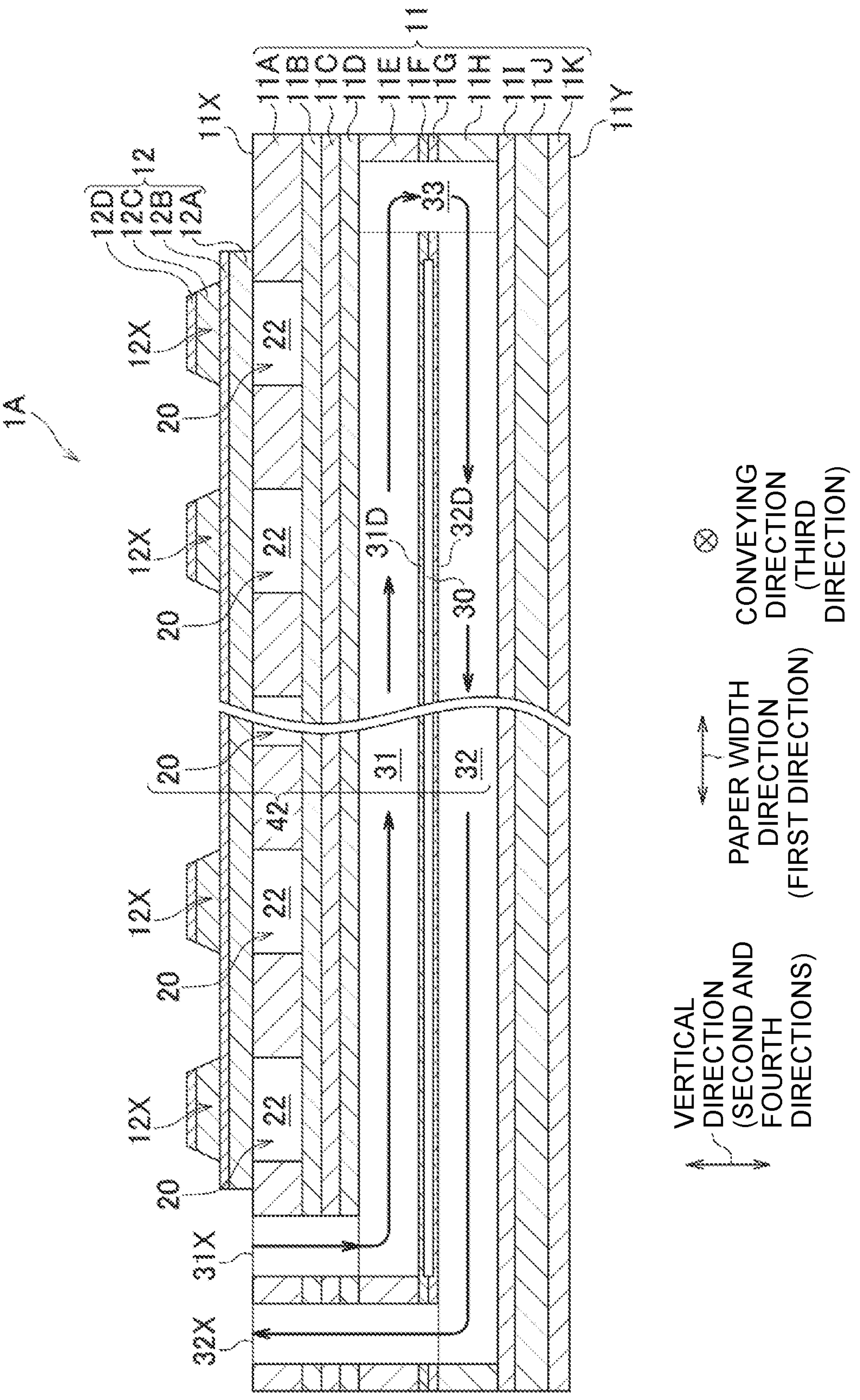
FIG. 7 is a cross-sectional view of the unit head, taken along a VII-VII line of FIG. 5.

Since the two unit heads 1A and 1B have a same configuration, an explanation will be given about the unit head 1A as one (one head unit) of the two head units, and an explanation about the head unit 1B as the other (the other head unit) of the two head units will be omitted. As depicted in FIGS. 5 and 7, the unit head 1A has a channel structure 11 and an actuator member 12.

Figure 6:
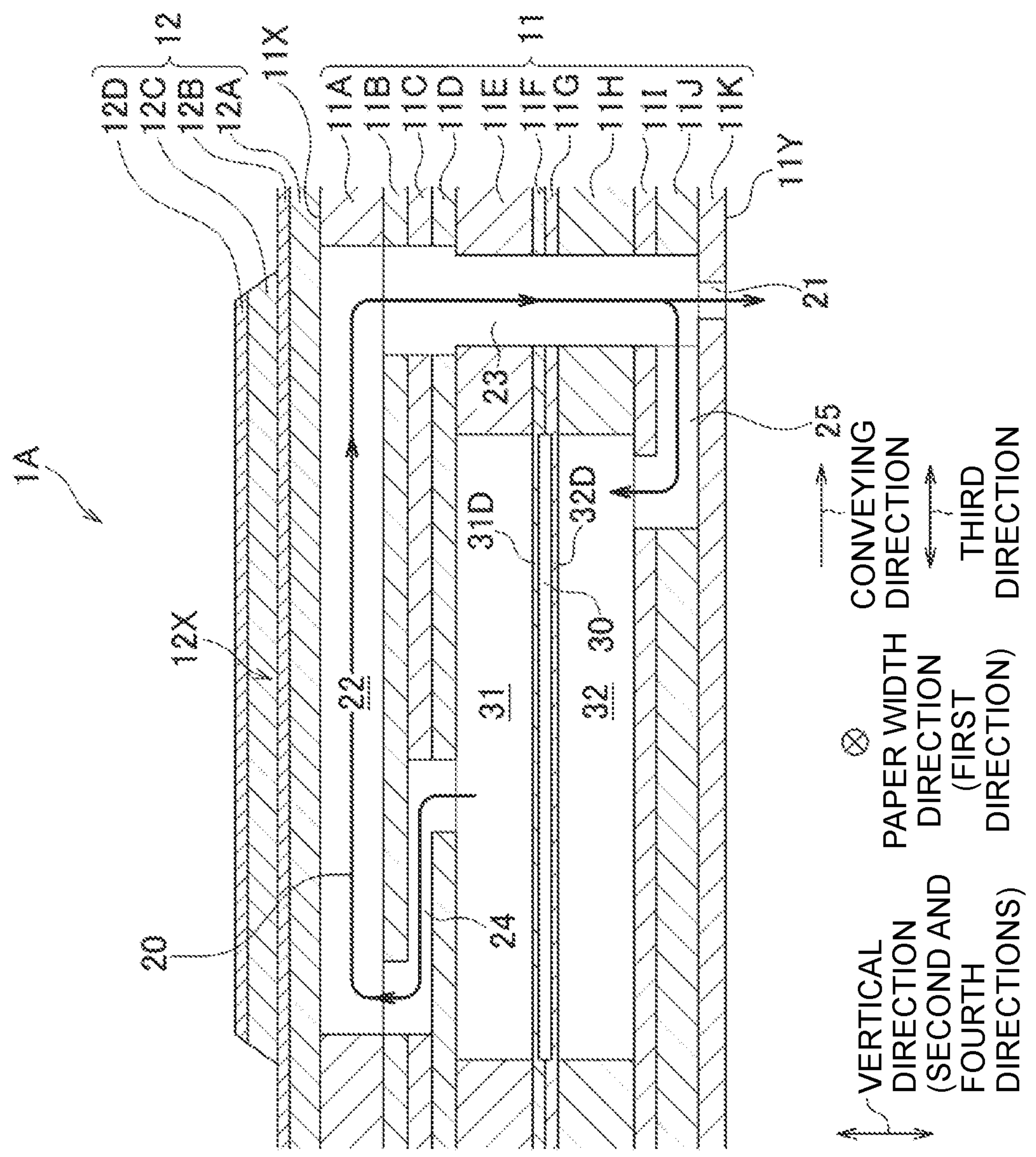
FIG. 6 is a cross-sectional view of the unit head, taken along a VI-VI line of FIG. 5.

The channel structure 11 is constructed of eleven plates 11A to 11K which are stacked in the vertical direction and adhered to one another, as depicted in FIGS. 6 and 7. A through hole constructing a channel is formed in each of the plates 11A to 11K. The channel includes a plurality of individual channels 20, a supply channel 31, a return channel 32 and a connecting channel 33.

As depicted in FIG. 5, six channel groups 41 to 46 are provided on the channel structure 11. Each of the six channel groups 41 to 46 is constructed of the plurality of individual channels 20 aligned in the paper width direction, and the supply channel 31, the return channel 32 and the connecting channel 33 communicating with the plurality of individual channels 20.

In each of the channel groups 41 to 46, the supply channel 31 and the return channel 32 are arranged side by side in the vertical direction (a "second direction" of the present disclosure; a height direction of each of the supply channel 31 and the return channel 32, and a direction crossing the first direction), and overlap with each other in the vertical direction, as depicted in FIGS. 6 and 7.

The six channel groups 41 to 46 are arranged side by side in a direction parallel to the conveying direction (a "third direction" of the present disclosure; a width direction of each of the supply channel 31 and the return channel 32, and is a direction orthogonal to both of the first direction and the second direction), at equal spacing distances therebetween.

Each of the supply channel 31 and the return channel 32 extends in the first direction. The supply channel 31 and the return channel 32 are substantially the same in the length (length in the first direction) thereof, the width (length in the third direction) thereof and the height (length in the second direction) thereof.

In each of the channel groups 41 to 46, the connecting channel 33 extends in the second direction and connects one end in the first direction of the supply channel 31 and one end in the first direction of the return channel 32, as depicted in FIG. 7.

The supply channel 31 and the return channel 32 communicate with a sub tank (not depicted in the drawings), respectively, via a supply port 31X and a discharge port 32X which communicate, respectively, with the other end in the first direction of the supply channel 31 and the other end in the first direction of the return channel 32. The supply port 31X and the discharge port 32X are provided, respectively, as two supply ports 31X and two discharge ports 32X opened in an upper surface 11X of the channel structure 11, as depicted in FIG. 5.

Each of the supply port 31X and the discharge port 32X which are arranged on the left side in FIG. 5 communicates with the three channel groups 41 to 43 among the six channel groups 41 to 46. Each of the supply port 31X and the discharge port 32X which are arranged on the right side in FIG. 5 communicates with the three channel groups 44 to 46 among the six channel groups 41 to 46. The supply port 31X and the discharge port 32X which are arranged on the left side are located at the same side in the first direction with respect to the plurality of individual channels 20 (the upper side in FIG. 5), and are arranged side by side in the first direction. In the first direction, the supply port 31X is positioned between the plurality of individual channels 20 and the discharge port 32X. Similarly, the supply port 31X and the discharge port 32X which are arranged on the right side are also located at the same side in the first direction with respect to the plurality of individual channels 20 (the upper side in FIG. 5), and are arranged side by side in the first direction. In the first direction, the supply port 31X is positioned between the plurality of individual channels 20 and the discharge port 32X.

The sub tank communicates with a main tank configured to store the ink and stores the ink supplied from the main tank. The ink in the sub tank flows from the supply port 31X to the supply channel 31 via a tube 17 and the channel member 1L, by a driving of a pump (not depicted in the drawings) through the control of the controller 5. The ink flowing into the supply channel 31 is supplied to the respective individual channels 20 (see FIG. 6) while moving in the supply channel 31 from the other end in the first direction (the left end in FIG. 7) toward the one end in the first direction (the right end in FIG. 7) of the supply channel 31. The ink flowed out of the respective individual channels 20 flows into the return channel 32. Further, the ink which has reached the one end in the first direction (the right end in FIG. 7) of the supply channel 31 flows in the connecting channel 33 and flows into the return channel 33. The ink flowing into the return channel 32 moves in the return channel 32 from the one end in the first direction toward the other end in the first direction (the left end in FIG. 7) of the return channel 32, and is returned to the sub tank via the discharge port 32X, the channel member 1L and a tube 18.

As depicted in FIGS. 6 and 7, the supply channel 31 is constructed of a through hole formed in the plate 11E. The return channel 32 is constructed of a through hole formed in the plate 11H. A damper chamber 30 is provided between the supply channel 31 and the return channel 32 in the second direction. The damper chamber 30 is constructed of a recessed part formed in the plate 11F and a recessed part formed in the plate 11G. A bottom part of the recessed part in the plate 11F functions as a damper film 31D of the supply channel 31. A bottom part of the recessed part in the plate 11G functions as a damper film 32D of the return channel 32.

Each of the plurality of individual channels 20 includes a nozzle 21, a pressure chamber 22, a communication channel 23, an inflow channel 24 and an outflow channel 25, as depicted in FIG. 6.

The nozzle 21 is constructed of a through hole formed in the plate 11K, and the nozzle 21 is opened in a lower surface 11Y of the channel structure 11. All the nozzles 21 formed in the unit head 1A are arranged so that a spacing distance, between two adjacent nozzles 21 which are included in the nozzles 21 and which are adjacent to each other in the first direction, are same in the unit head 1A.

The pressure chamber 22 is constructed of a through hole formed in the plate 11A, and the pressure chamber 22 is opened in the upper surface 11X of the channel structure 11. The pressure chamber 22 has a substantially rectangular planar shape which is long in the third direction. With respect to the pressure chamber 22, the inflow channel 24 is connected to one end in the third direction of the pressure chamber 22, and the communicating channel 23 is connected to the other end in the third direction of the pressure chamber 22.

The communicating channel 23 is constructed of through holes formed, respectively, in the plates 11B to 11J, and extends in the second direction. The communicating channel 23 is arranged between the nozzle 21 and the pressure chamber 22 in the second direction, and connects the nozzle 21 and the pressure chamber 22 with each other.

The inflow channel 24 is constructed of through holes formed, respectively, in the plate 11B to 11D. The inflow channel 24 has an upper end connecting to the pressure chamber 22 and a lower end connecting to the supply channel 31. The outflow channel 25 is constructed of through holes formed, respectively, in the plates 11I and 11J. The outflow channel 25 has one end connecting to the lower end of the communicating channel 23 and the other end connecting to the return channel 32. Each of the inflow channel 24 and the outflow channel 25 has a width (a length in the first direction) smaller than a width (a length in the first direction) of the pressure chamber 22, and functions as a throttle.

The ink supplied from the supply channel 31 to each of the individual channels 20 flows into the pressure chamber 22 through the inflow channel 24, moves substantially horizontally in the pressure chamber 22, and flows into the communicating channel 23. The ink inflowed into the communicating channel 23 moves downward in the communicating channel 23; a part of the ink is ejected from the nozzle 21 and the remainder of the ink flows in the outflow channel 25 and flows into return channel 32.

By circulating the ink between the sub tank and the channel structure 11 in such a manner, discharge (exhaust) of air and/or prevention of any increase in the viscosity of the ink in the supply channel 31 and the return channel 32 formed in the channel structure 11 as well as in each of the individual channels 20 formed in the channel structure 11 are achieved. Further, in a case that the ink contains any sedimentary component (a component which might sediment, such as a pigment, etc.), such a sedimentary component is agitated, thereby preventing the sedimentation thereof.

As depicted in FIGS. 6 and 7, the actuator member 12 includes a vibration plate 12A, a common electrode 12B, a plurality of piezoelectric bodies 12C and a plurality of individual channels 12D, in this order from the lower side. The vibration plate 12A and the common electrode 12B are arranged on the upper surface 11X of the channel structure 11, and cover all of the pressure chambers 22 formed in the plate 11A. On the other hand, each of the plurality of piezoelectric bodies 12C and each of the plurality of individual electrodes 12D are provided on one of the pressure chambers 22, and overlap with one of the pressure chambers 22 in the second direction.

The common electrode 12B and the plurality of individual electrodes 12D are electrically connected to one of a wiring member 1M and a wiring member 1N having, respectively, a driver IC 1M and a driver IC 1N mounted thereon, as depicted in FIG. 3. The unit head 1A has the wiring member 1M, and the unit head 1B has the wiring member 1N. Each of the driver ICs 1M and 1N maintains the potential of the common electrode 12B at the ground potential, whereas each of the driver ICs 1M and 1N changes the potential of the plurality of individual electrodes 12D. Specifically, each of the driver ICs 1M and 1N generates a driving signal based on a control signal from the controller 5, and applies the driving signal to each of the plurality of individual electrodes 12D. With this, the potential of each of the plurality of individual electrodes 12D is changed between a predetermined driving potential and the ground potential. In this situation, a part of the vibration plate 12A and a part of each of the plurality of piezoelectric bodies 12C which are sandwiched between one of the plurality of individual electrodes 12D and one of the pressure chambers 22 (an actuator 12X) is deformed so as to project toward the one of the pressure chambers 22. Due to this deformation, the volume of the pressure chamber 22 is changed, which in turn applies the pressure to the ink inside the pressure chamber 22, thereby causing the ink to be ejected from a nozzle 21 corresponding to the pressure chamber 22. The actuator member 12 has a plurality of pieces of the actuator 12X each of which corresponds to one of the plurality of pressure chambers 22. The plurality of actuators 12X are arranged along the first direction so as to correspond, respectively, to the nozzles 21, as depicted in FIGS. 6 and 7.

As depicted in FIG. 3, the wiring member 1M has two first wiring substrate 1M1 and a second wiring substrate 1M2. Each of the two first wiring substrate 1M1 is constructed of a Chip On Film (COF) having the driver IC 1M3 mounted thereon, and has one end part electrically connected to the common electrode 12B and the plurality of individual electrodes 12D, and the other end part electrically connected to the second wiring substrate 1M2. Each of the two first wiring substrates 1M1 is pulled or drawn once from the upper surface of the actuator member 12 to the outside of the actuator member 12 along the first direction, and is bent or curved so that the other end part of each of the two first wiring substrates 1M1 is arranged at a location above the actuator member 12. The second wiring substrate 1M2 is constructed of a Flexible Printed Circuits (FPC), and has one end part electrically connected to the two first wiring substrate 1M1 at the location above the actuator member 12. The second wiring substrate 1M2 is pulled once from the location above the actuator member 12 along the third direction to a side opposite to the unit head 1B, and is curved so that the other end part of the second wiring substrate 1M2 is arranged at the location above the actuator member 12.

The wiring member 1N has a configuration similar to the configuration of the wiring member 1M. As depicted in FIG. 3, the wiring member 1N has two first wiring substrate 1N1 and a second wiring substrate 1N2. Each of the two first wiring substrate 1N1 is constructed of a Chip On Film (COF) having the driver IC 1N3 mounted thereon, and has one end part electrically connected to the common electrode 12B and the plurality of individual electrodes 12D, and the other end part electrically connected to the second wiring substrate 1N2. Each of the two first wiring substrates 1N1 is pulled or drawn once from the upper surface of the actuator member 12 to the outside of the actuator member 12 along the first direction, and is bent or curved so that the other end part of each of the two first wiring substrates 1N1 is arranged at a location above the actuator member 12. The second wiring substrate 1N2 is constructed of a Flexible Printed Circuits (FPC), and has one end part electrically connected to the two first wiring substrate 1N1 at the location above the actuator member 12. The second wiring substrate 1N2 is pulled once from the location above the actuator member 12 along the third direction to a side opposite to the unit head 1A, and is curved so that the other end part of the second wiring substrate 1N2 is arranged at the location above the actuator member 12.

As depicted in FIG. 2, each of these wiring members 1M and 1N is connected to one of two connectors 1K2 of the wiring substrate 1K. As depicted in FIGS. 2 and 3, the wiring substrate 1K has a substrate 1K, the two connectors 1K2 and one connector 1K3. A plurality of non-illustrated wirings is formed in the substrate 1K1, and the two connectors 1K2 and the connector 1K3 are electrically connected to the plurality of wirings. The two connector 1K2 are arranged on the upper surface of the substrate 1K1, respectively at both end parts thereof in the third direction. The connector 1K3 is arranged on the upper surface of the substrate 1K1, at a location between the two connectors 1K2. Owing to such a configuration, it is possible to integrate the two wiring members 1M and 1N in the one wiring substrate 1K.

Figure 4:
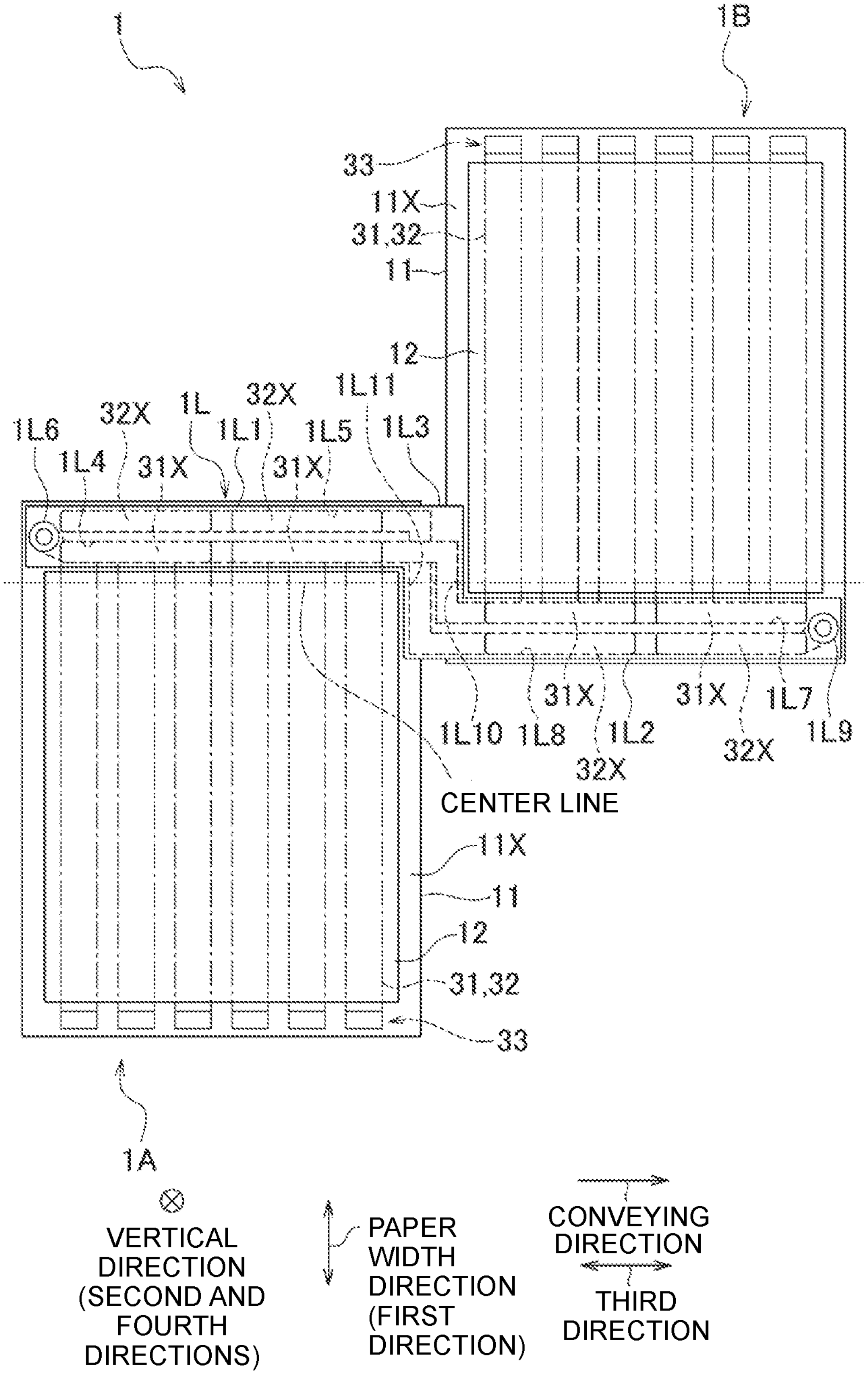
FIG. 4 is a plan view depicting a positional relationship between two unit heads included in the head depicted in FIG. 1.

Here, an explanation will be given about a positional relationship between the two unit heads 1A and 1B which are adjacent to each other in the third direction. The two unit heads 1A and 1B are arranged while being shifted from each other along the first direction so that a spacing distance between a nozzle 21 which belongs to the unit head 1A and which is the closest to the unit head 1B and a nozzle 21 which belongs to the unit head 1B and which is the closest to the unit head 1A is same as a spacing distance between the nozzles 21 of each of the unit heads 1A and 1B. The two unit heads 1A and 1B are arranged to be shifted from each other in the third direction. Further, as depicted in FIG. 4, in the two unit heads 1A and 1B, a set of the supply ports 31X and the discharge ports 32X of the unit head 1A and a set of the supply ports 31X and the discharge ports 32X of the unit head 1B are arranged to be opposite to each other in the first direction. Namely, the set of the supply ports 31X and the discharge ports 32X of the unit head 1A is arranged at an upper end part in FIG. 4 in the channel structure 11, and the set of the supply ports 31X and the discharge ports 32X of the unit head 1B is arranged at a lower end part in FIG. 4 in the channel structure 11. Further, the two unit heads 1A and 1B are arranged so that the supply channels 31 of the unit head 1A each have a part or portion overlapping with the supply channels 31 of the unit head 1B in the third direction.

As depicted in FIG. 3, the support frame 1F has a frame 1F1 and two bottom plates 1F2. The frame 1F1 is formed to be in a shape of an outer edge of the two unit heads 1A and 1B which are arranged as depicted in FIG. 4. Each of the two bottom plates 1F2 has a planar shape which is greater, to some extent, than the upper surface 11X of the channel structure 11. A bottom plate 1F2 as one of the two bottom plates 1F2 is arranged to close a part on one side in the third direction (the left side in FIG. 3) of the frame 1F1 from therebelow, and another bottom plate F2 as the other of the two bottom plates 1F2 is arranged to close a part on the other side in the third direction (the right side in FIG. 3) of the frame 1F1 from therebelow.

As depicted in FIG. 3, each of the two bottom plates 1F2 is formed with a through hole 1F3 formed in a central part of the bottom plate 1F2, two through holes 1F4 and two through holes 1F5. The two through holes 1F4 are arranged at an end part, in the first direction of a bottom plate 1F2 as one of the two bottom plates 1F2, which is on the side of another bottom plate 1F2 as the other of the two bottom plates 1F2. The two through holes 1F5 are arranged at a location which is outside in the first direction with respect to the two through holes 1F4 of each of the two bottom plates 1F2. In the lower surface of each of the two bottom plates 1F2, one of the unit head 1A and the unit head 1B is fixed. The actuator member 12 is arranged in the through hole 1F3 of each of the two bottom plates 1F2, each of the two through holes 1F4 communicates with one of the two supply ports 31X, and each of the two through holes 1F5 communicates with one of the two discharge ports 32X.

As depicted in FIGS. 3 and 4, the channel member 1L has a first part 1L1, a second part 1L2 and a linking part 1L3. The first part 1L1 extends in the third direction, and is arranged on the bottom plate 1F2 to which the unit head 1A is fixed. Further, the first part 1L1 is arranged, with respect to a center line in the first direction of the unit heads 1A and 1B (a center line depicted in FIG. 4), on a side opposite to the actuator member 12 (more specifically, the center of gravity of the plurality of actuators 12X belonging to the actuator member 12) of the unit head 1A in the first direction.

As depicted in FIG. 4, the first part 1L1 has two channels 1L4 and 1L5 extending in the third direction and a first connecting port 1L6. The channel 1L4 is arranged at a position overlapping with the two supply ports 31X of the unit head 1A in the vertical direction, and communicates with these two supply ports 31X via the two through holes 1F4. The channel 1L5 is arranged at a position overlapping with the two discharge ports 32X of the unit head 1A in the vertical direction, and communicates with these two discharge ports 32X via the two through holes 1F5. In such a manner, the first part ILI connects to the supply ports 31X and the discharge ports 32X of the unit head 1A. As depicted in FIG. 3, the first connecting port 1L6 has a cylindrical shape and is configured to be connectable to the tube 17. Further, as depicted in FIG. 4, the first connecting port 1L6 is arranged at a position overlapping with an outer end part in the third direction of the unit head 1A (an end part, of the unit head 1A, which is farthest in the third direction from the unit head 1B adjacent to the unit head 1A). The channel 1L4 communicates with the first connecting port 1L6.

As depicted in FIGS. 3 and 4, the second part 1L2 extends in the third direction, and is arranged on the bottom plate 1F2 to which the unit head 1B is fixed. Further, the second part 1L2 is arranged, with respect to the center line in the first direction of the unit heads 1A and 1B, on a side opposite to the actuator member 12 (more specifically, the center of gravity of the plurality of actuators 12X belonging to the actuator member 12) of the unit head 1B in the first direction.

As depicted in FIG. 4, the second part 1L2 has two channels 1L7 and 1L8 extending in the third direction and a second connecting port 1L9. The channel 1L7 is arranged at a position overlapping with the two supply ports 31X of the unit head 1B in the vertical direction, and communicates with these two supply ports 31X via the two through holes 1F4. The channel 1L8 is arranged at a position overlapping with the two discharge ports 32X of the unit head 1B in the vertical direction, and communicates with these two discharge ports 32X via the two through holes 1F5. In such a manner, the second part 1L2 connects to the supply ports 31X and the discharge ports 32X of the unit head 1B. As depicted in FIG. 3, the second connecting port 1L9 has a cylindrical shape and is configured to be connectable to the tube 18. Further, as depicted in FIG. 4, the second connecting port 1L9 is arranged at a position overlapping with an outer end part in the third direction of the unit head 1B (an end part, of the unit head 1B, which is farthest in the third direction from the unit head 1A adjacent to the unit head 1B). The channel 1L8 communicates with the first connecting port 1L9.

As depicted in FIG. 4, the linking part 1L3 has two channels 1L10 and 1L11. The two channels 1L10 and 1L11 extend in the first direction and are formed to bypass each other so as not to communicate with each other in the linking part 1L3. The channel 1L10 communicates with the channel 1L4 of the first part 1L1 and the channel 1L7 of the second part 1L2. With this, the two supply ports 31X of each of the unit heads 1A and 1B communicate with the first connecting port 1L6 via the channels 1L4, 1L7 and 1L10. With this, the ink supplied via the tube 17 flows into the two supply ports 31X of each of the unit heads 1A and 1B. The channels 1L4, 1L7 and 1L10 correspond to a "first channel" of the present disclosure.

The channel 1L11 communicates with the channel 1L5 of the first part 1L1 and the channel 1L8 of the second part 1L2. With this, the two discharge ports 32X of each of the unit heads 1A and 1B communicate with the second connecting port 1L9 via the channels 1L5, 1L8 and 1L11. With this, the ink discharged from the two discharge ports 32X of each of the unit heads 1A and 1B is returned to the sub tank via the channels 1L5, 1L8 and 1L11 and the tube 18. The channels 1L5, 1L8 and 1L11 correspond to a "second channel" of the present disclosure.

The heat sink 1H (corresponding to a "heat sink" of the present disclosure) is formed, for example, of a metal such as copper, aluminum, etc., the heat sink 1H may be formed of any material provided that the material has a high thermal conductivity. As depicted in FIG. 3, the heat sink 1H has a first connecting part 1H1, a second connecting part 1H2 and a linking part 1H3. The first connecting part 1H1 is arranged on the unit head 1A, and makes contact with the two driver ICs 1M3 of the wiring member 1M. The second connecting part 1H2 is arranged on the unit head 1B, and makes contact with the two driver ICs 1N3 of the wiring member 1N. With this, it is possible to release the heat of the driver ICs 1M3 and 1N3, respectively, of the unit heads 1A and 1B.

As depicted in FIG. 3, the linking part 1H3 extends in the first direction and links the first connecting part 1H1 and the second connecting part 1H2 integrally. The linking part 1H3 is arranged, in the vertical direction, so as to link to an upper half part of each of the first connecting part 1H1 and the second connecting part 1H2. With this, in a state that the heat sink 1H is arranged on the two unit heads 1A and 1B, the linking part 1H3 is separated away from the respective unit heads 1A and 1B in the vertical direction (a "fourth direction" of the present disclosure). As depicted in FIG. 3, the linking part 1L3 of the channel member 1L is arranged between the linking part 1H3 and the respective unit heads 1A and 1B. This makes it possible to realize a small-sized head 1.

As depicted in FIG. 2, the cover 1G has a lid-like shape capable of covering the two unit heads 1A and 1B supported by the supporting frame 1F. The cover 1G is placed on the supporting frame 1F in a state that the cover 1G covers the two unit heads 1A and 1B. Further, a top plate 1G1 of the cover 1G is formed with through holes 1G2 and 1G3 configured to allow, respectively, the tubes 17 and 18 to pass therethrough.

As described above, according to the head 1 of the present embodiment, among the two unit heads 1A and 1B which are adjacent to each other, the set of the supply ports 31X and the discharge ports 32X of the unit head 1A is arranged on the side of the one end part in the first direction of the channel structure 11 (on the side of the unit head 1B), and the set of the supply ports 31X and the discharge ports 32X of the unit head 1B is arranged on the side of the other end part in the first direction of the channel structure 11 (on the side of the unit head 1A). Owing to this, it is possible to make the difference in the temperature between the end part, of the unit head 1A, on the side of the unit head 1B and the end part, of the unit head 1B, on the side of the unit head 1A small. As a result, in the two adjacent unit heads 1A and 1B, it is possible to make the difference in the ink ejection amount due to the difference in the temperature small, and consequently to suppress the unevenness in the density due to the difference in the ink ejection amount.

The set of the supply ports 31X and the discharge ports 32X of the unit head 1A is arranged, in the first direction, at the end part, of the unit head 1A, on the side of the unit head 1B; and the set of the supply ports 31X and the discharge ports 32X of the unit head 1B is arranged, in the first direction, at the end part, of the unit head 1B, on the side of the unit head 1A. With this, the sets of the supply ports 31X and the discharge ports 32X, respectively, of the two adjacent unit heads 1A and 1B are arranged in the first direction at positions, respectively, which are close to each other. Owing to this, an operation in a case of attaching or detaching the channel member 1L with respect to the supply ports 31X and the discharge ports 32X of each of the unit heads 1A and 1B can be performed easily. Further, it is possible to miniaturize the channel member 1L, as compared with such a case that the sets of the supply port 31X and the discharge port 32X of the respective unit heads 1A and 1B are arranged, respectively, at outer locations which are away from each other in the first direction. Accordingly, it is possible to make a channel length itself in the channel member 1L short, thereby making it possible to make any pressure loss small.

The head 1 has the supporting frame 1F configured to support the two unit heads 1A and 1B. With this, it is possible to exchange the adjacent two unit heads 1A and 1B together with the supporting frame 1F. Owing to this, it is possible to prevent from any positional deviation from occurring in the two adjacent unit heads 1A and 1B, as compared with a configuration wherein the adjacent two unit heads 1A and 1B are exchanged independently from each other.

The channel member 1L has the channels 1L4, 1L7 and 1L10 connected to the two supply ports 31X of the unit head 1A and to the two supply ports 31X of the unit head 1B, and the channel member 1L has the channels 1L5, 1L8 and 1L11 connected to the two discharge ports 32X of the unit head 1A and to the two discharge ports 32X of the unit head 1B. With this, it is possible to integrate the supply ports 31X of each of the adjacent two unit heads 1A and 1B to the one connecting port 1L6, by the channels 1L4, 1L7 and 1L10. Similarly, it is possible to integrate the discharge ports 32X of each of the adjacent two unit heads 1A and 1B to the one connecting port 1L9, by the channels 1L5, 1L8 and 1L11. Owing to this, the workability in a case of exchanging the two adjacent unit heads 1A and 1B is improved.

The first connecting port 1L6 of the channel member 1L is arranged at the position overlapping with the outer end part in the third direction of the unit head 1A, and the second connecting port 1L9 of the channel member 1L is arranged at the position overlapping with the outer end part in the third direction of the unit head 1B. With this, it is possible to easily connect a piping member such as the tubes 17 and 18, etc., to the channel member 1L via the two connecting ports 1L6 and 1L9. Accordingly, the workability in the case of exchanging the two adjacent unit heads 1A and 1B is further improved.

The first part 1L1 of the channel member 1L is arranged, with respect to the center line, on the side opposite to the actuator member 12 of the unit head 1A in the first direction. Similarly, the second part 1L2 of the channel member 1L is arranged, with respect to the center line, on the side opposite to the actuator member 12 of the unit head 1B in the first direction. With this, the tubes 17 and 18 connected, respectively, to the connecting ports 1L6 and 1L9 are allowed to extend upward and to be drawn or routed, while avoiding the first connecting part 1H1 and the second connecting part 1H2 of the heat sink 1H and a part, in the substrate 1K1, which is located above the actuator member 12.

The wiring member 1M of the unit head 1A is drawn to the side opposite to the unit head 1B in the third direction, and the wiring member 1N of the unit head 1B is drawn to the side opposite to the unit head 1A in the third direction. Further, the wiring members 1M and 1N, respectively, of the unit heads 1A and 1B are connected to the wiring substrate 1K. With this, it is possible to integrate the wiring members 1M and 1N, respectively, of the two adjacent heads 1A and 1B to the one wiring substrate 1K. Owing to this, the workability in the case of exchanging the two adjacent unit heads 1A and 1B is improved.

The heat sink 1H is connected to the two adjacent unit heads 1A and 1B. With this, the difference in the temperature between the two adjacent unit heads 1A and 1B is made further small.

The two unit heads 1A and 1B are arranged so that the supply channels 31 of the unit head 1A each have a part overlapping, in the third direction, with the supply channels 31X of the unit head 1B. With this, the difference in the temperature between the two adjacent unit heads 1A and 1B can be made small effectively.

Second Embodiment

Figure 8:
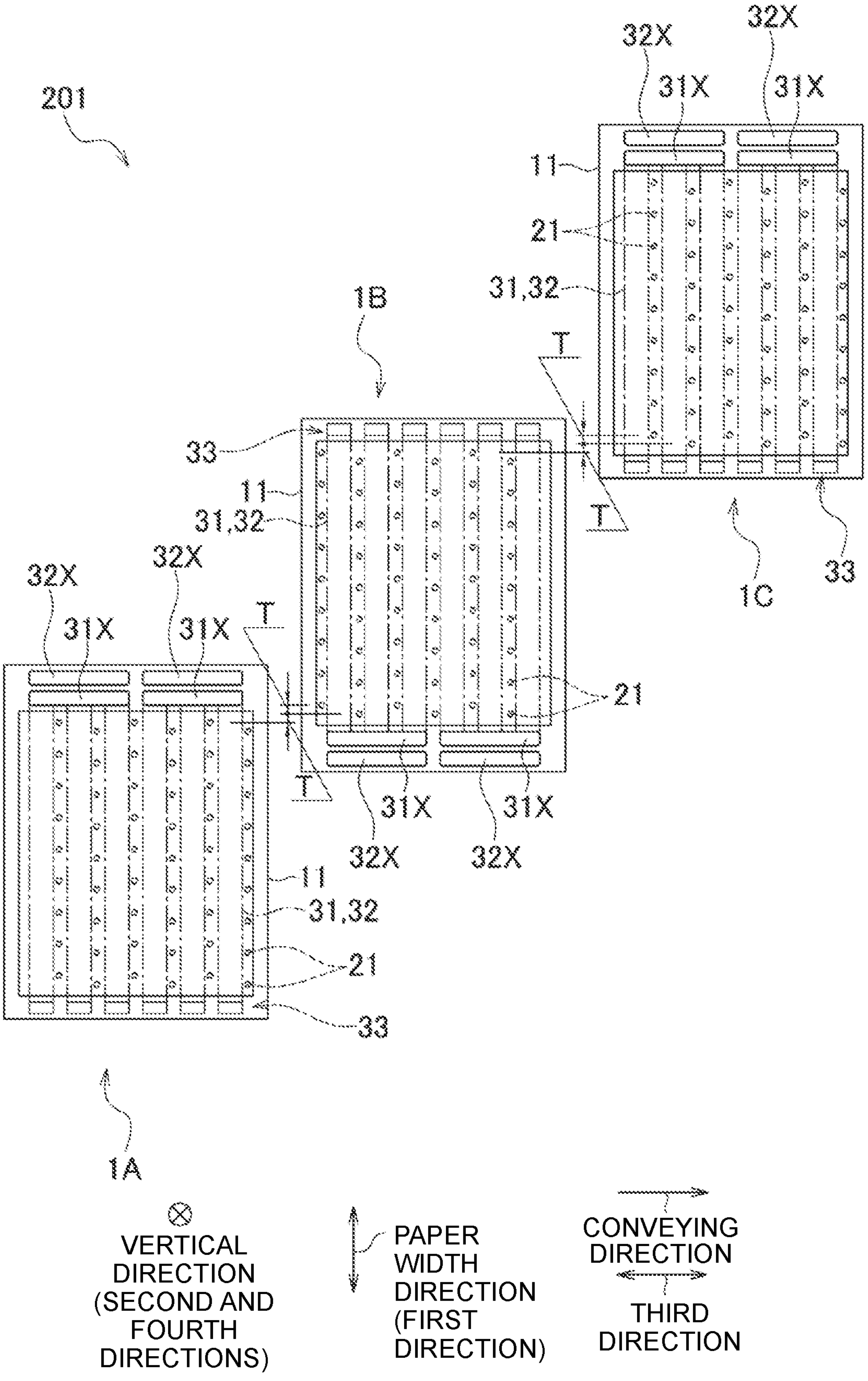
FIG. 8 is a plan view depicting a positional relationship among three unit heads included in a head according to another embodiment of the present disclosure.

Next, a head 201 according to a second embodiment of the present disclosure will be explained, with reference to FIG. 8. A configuration of the second embodiment which is similar to that of the first embodiment is designated by the same reference numeral, and any explanation therefor will be omitted. The head 201 in the second embodiment has three unit heads 1A to IC. Specifically, the head 201 has the unit head 1C, in addition to the above-described unit heads 1A and 1B. Note that the unit head 1C has a configuration same as or similar to those of the above-described unit heads 1A and 1B.

The two unit heads 1A and 1B have a positional relationship similar to that of the above-described first embodiment.

The unit head 1C is adjacent to the unit head 1B in the third direction, and is arranged to be shifted from the unit head 1B in the first direction. In the first direction, a spacing distance between a nozzle 21, which belongs to the unit head 1B and is closest to the unit head 1C, and a nozzle 21, which belongs to the unit head 1C and is closest to the unit head 1B is equal to a spacing distance T of the nozzles 21 in each of the unit heads 1B and 1C. The unit head 1C is arranged, in the third direction, to be shifted with respect to the unit head 1B and on a side opposite to the unit head 1A. Further, as depicted in FIG. 8, a set of the supply ports 31X and the discharge ports 32X of the unit head 1B and a set of the supply ports 31X and the discharge ports 32X of the unit head 1C are arranged to be opposite to each other in the first direction. Namely, the set of the supply ports 31X and the discharge ports 32X of the unit head 1B is arranged at a lower end part in FIG. 8 in the channel structure 11, and the set of the supply ports 31X and the discharge ports 32X of the unit head 1C is arranged at an upper end part in FIG. 8 in the channel structure 11. Further, the two unit heads 1B and 1C are arranged so that the supply channels 31 of the unit head 1B each have a part or portion overlapping with the supply channels 32 of the unit head 1C in the third direction.

As described above, also in the head 201 of the second embodiment, among the three unit heads 1B and 1C which are adjacent to each other, the set of the supply ports 31X and the discharge ports 32X of the unit head 1B is arranged on the side of the one end part in the first direction of the channel structure 11 (on the side opposite to the unit head 1C), and the set of the supply ports 31X and the discharge ports 32X of the unit head 1C is arranged on the side of the other end part in the first direction of the channel structure 11 (on the side opposite to the unit head 1B). Owing to this, it is possible to make the difference in the temperature between the end part, of the unit head 1B, on the side of the unit head 1C and the end part, of the unit head 1C, on the side of the unit head 1B small. As a result, not only in the two adjacent unit heads 1A and 1B as described above but also in the two adjacent heads 1B and 1C, it is possible to make the difference in the ink ejection amount due to the difference in the temperature small, and consequently to suppress the unevenness in the density due to the difference in the ink ejection amount.

In the foregoing, although the embodiments of the present disclosure have been explained, the present disclosure is not limited to or restricted by the above-described embodiments; a variety of kinds of changes is possible, within the scope of the claims.

In the above-described second embodiment, although the head 201 has the three unit heads 1A to 1C, it is allowable that the head 201 has only the two unit heads 1B and IC. Alternatively, it is allowable that the head has four or more unit heads.

Further, in the above-described second embodiment, although the three unit heads 1A, 1B and 1C are arranged to be shifted from one another in this order toward one side in the third direction, it is allowable that the unit head 1A and the unit head 1C are arranged at positions, respectively, which are same in the third direction and are arranged side by side in the first direction. By doing so, it is possible to reduce the size in the third direction of the head. Alternatively, it is allowable that the unit head 1A and the unit head 1C are arranged at positions, respectively, which are same in the first direction and are arranged side by side along the third direction. By doing so, it is possible to reduce the size in the first direction of the head. The supply channel and the return channel may be arranged side by side in the width direction of each of the channels. Namely, the second direction is not limited to the vertical direction.

In the above-described embodiments, although the plurality of channel groups is provided, it is allowable to provide one channel group (a plurality of individual channels, and a supply channel, a return channel and a connecting channel which communicate with the plurality of individual channel).

The liquid ejecting head is not limited to being a head of the line system, and may be a head of a serial system (a system in which a head ejects liquid from a nozzle toward an object of ejection while the head is being moved in a scanning direction parallel to the paper width direction).

The object of ejection is not limited to the paper sheet, and may be, for example, cloth (fabric), a substrate, etc.

The liquid ejected from the nozzles is not limited to the ink, and may be any liquid (e.g., a treatment liquid which agglutinates or precipitates constituents of ink, etc.).

The present disclosure is applicable also to facsimiles, copy machines, multifunction peripherals, etc., without being limited to printers. Further, the present disclosure is applicable also to a liquid ejecting head used for any other application than the image recording (for example, a liquid ejecting head which forms an electroconductive pattern by ejecting an electroconductive liquid onto a substrate).

What is claimed is:

1. A liquid ejecting head comprising a plurality of unit heads, wherein each of the unit heads includes a channel structure and a plurality of actuators arranged on the channel structure, the channel structure has:

a plurality of nozzles aligned along a first direction;

a supply channel extending in the first direction and communicating with the nozzles;

a return channel extending in the first direction, communicating with the nozzles, and arranged side by side with the supply channel in a second direction crossing the first direction;

a connecting channel connecting one end in the first direction of the supply channel and one end in the first direction of the return channel;

a supply port communicating with the other end in the first direction of the supply channel; and a discharge port communicating with the other end in the first direction of the return channel, each of the actuators is configured to apply energy to liquid in the channel structure to cause the liquid to be ejected from one of the nozzles, the actuators being arranged along the first direction to correspond to the nozzles, respectively, the unit heads are arranged to be shifted from each other in the first direction, the unit heads include two unit heads which are adjacent to each other in a third direction being orthogonal to the first direction and the second direction, the two unit heads have a same spacing distance in the first direction between the nozzles, and in the two unit heads, a set of the supply port and the discharge port of one unit head and a set of the supply port and the discharge port of the other unit head are arranged to be opposite to each other in the first direction.

2. The liquid ejecting head according to claim 1, wherein the supply channel of the one unit head has a part overlapping with the supply channel of the other unit head in the third direction.

3. The liquid ejecting head according to claim 1, wherein
in the channel structure of the one unit head, the set of the supply port and the discharge port is arranged at an end part in the first direction on a side of the other unit head, and
in the channel structure of the other unit head, the set of the supply port and the discharge port is arranged at an end part in the first direction on a side of the one unit head.

4. The liquid ejecting head according to claim 3, further comprising a channel member having a first channel connected to the supply port of each of the two unit heads, and a second channel connected to the discharge port of each of the two unit heads.

5. The liquid ejecting head according to claim 4, wherein
the channel member has a first connecting port communicating with the first channel and a second connecting port communicating with the second channel,
the first connecting port is arranged at a position overlapping with an outer end part in the third direction of the one unit head, and
the second connecting port is arranged at a position overlapping with an outer end part in the third direction of the other unit head.

6. The liquid ejecting head according to claim 3, further comprising a channel member having a first part connected to the supply port and the discharge port of the one unit head, and a second part connected to the supply port and the discharge port of the other unit head,
wherein the first part and the second part extend in the third direction,
the first part is arranged on a side in the first direction opposite to a center of gravity of the actuators of the one unit head with respect to a center line in the first direction of the two unit heads, and
the second part is arranged on a side in the first direction opposite to a center of gravity of the actuators of the other unit head with respect to the center line.

7. The liquid ejecting head according to claim 1, further comprising one supporting frame configured to support the two unit heads.

8. The liquid ejecting head according to claim 1, further comprising a wiring board,
wherein each of the unit heads has a wiring member connected to the actuators,
the wiring member of the one unit head is drawn in the third direction to a side opposite to the other unit head,
the wiring member of the other unit head is drawn in the third direction to a side opposite to the one unit head, and
the wiring board is connected to the wiring member of each of the two unit heads.

9. The liquid ejecting head according to claim 1, further comprising a heat sink connected to the two unit heads.

10. The liquid ejecting head according to claim 9, further comprising a channel member having a first channel connected to the supply port of each of the two unit heads, and a second channel connected to the discharge port of each of the two unit heads,
the heat sink has a first connecting part connected to the one unit head, a second connecting part connected to the other unit head, and a linking part linking the first connecting part and the second connecting part to each other,
the linking part is separated from the two unit heads in a fourth direction orthogonal to the first direction and the third direction, and
the channel member is arranged between the linking part and the two unit heads.

* * * * *